United States Patent
West, Jr.

(10) Patent No.: US 6,570,693 B2
(45) Date of Patent: May 27, 2003

(54) REVERSE PATH OPTICAL COMBINING USING AN OPTICAL COMMUTATOR

(75) Inventor: Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 228 days.

(21) Appl. No.: 09/840,766

(22) Filed: Apr. 23, 2001

(65) Prior Publication Data

US 2002/0154368 A1 Oct. 24, 2002

(51) Int. Cl.[7] .............................................. H04B 10/12
(52) U.S. Cl. ..................... 359/173; 359/110; 359/125; 359/157; 359/167; 359/128; 370/537; 375/260; 375/295
(58) Field of Search ................................ 359/110, 125, 359/173, 157, 167, 128; 370/537; 375/260, 295

(56) References Cited

U.S. PATENT DOCUMENTS

| | | | |
|---|---|---|---|
| 5,325,102 A | 6/1994 | Page | 342/375 |
| 5,347,288 A | 9/1994 | Page | 342/375 |
| 6,002,365 A | 12/1999 | Page | 342/375 |
| 6,204,947 B1 | 3/2001 | Page | 359/145 |

OTHER PUBLICATIONS

U.S. Ser. No. 09/102,334 filed Jun. 22, 1998, by Forrest M. Farhan and Alberto P. Giabazzi entitled "Digital Optical Transmitter".

Primary Examiner—Leslie Pascal
Assistant Examiner—Hanh Phan
(74) Attorney, Agent, or Firm—Kenneth M. Massaroni; Hubert J. Barnhardt, III; Shelley L. Couturier

(57) ABSTRACT

An optical commutator (310) for combining optical signals emanating from a plurality of optical transmitters (305a–n). The commutator (310) includes a plurality of input ports connected to each optical transmitter (305a–n) via an optical fiber (315a–n). The optical transmitters transmits the optical signals within a predetermined bandwidth. A switching means (410) sequentially connects each of the plurality of input ports to an output port (415), where each of the plurality of inputs ports is connected to the output port (415) at a frequency greater than twice the predetermined bandwidth. The output port (415) then provides a combined optical signal that includes the plurality of optical signals.

11 Claims, 5 Drawing Sheets

REVERSE PATH OPTICAL COMBINING USING AN OPTICAL COMMUTATOR

FIELD OF THE INVENTION

This invention relates generally to broadband communications systems, such as hybrid/fiber coaxial (HFC) systems, and more specifically to an apparatus for combining optical signals from a plurality of optical transmitters.

BACKGROUND OF THE INVENTION

FIG. 1 is a block diagram illustrating an example of one branch of a conventional broadband communications system, such as a two-way hybrid/fiber coaxial (HFC) system, that carries optical and electrical signals. Such a system may be used in, for example, a cable television network; a voice delivery network, such as a telephone system; and a data delivery network to name but a few. The communications system 100 includes headend equipment 105 for generating forward signals (e.g., voice, video, or data signals) that are typically transmitted as optical signals in the forward, or downstream, direction along a first communication medium, such as a fiber optic cable 110. Coupled to the headend equipment 105 are optical nodes 115 that convert the optical signals to radio frequency (RF), or electrical, signals. The electrical signals are further transmitted along a second communication medium, such as coaxial cable 120, and are amplified, as necessary, by one or more distribution amplifiers 125 positioned along the communication medium.

Passive splitter/combiner devices 130 may also be added to the network 100 to split the electrical signals in the forward path, thereby delivering signals to separate portions of the network 100. Taps 135 then further split the forward signals for provision to subscriber equipment 140, such as set-top terminals, computers, telephone handsets, modems, and televisions. It will be appreciated that only one branch connecting the headend equipment 105 with the plurality of subscriber equipment 140 is shown for simplicity; however, there are typically several different fiber links connecting the headend equipment 105 with several additional nodes 115, amplifiers 125, and subscriber equipment 140.

In a two-way system, the subscriber equipment 140 can also generate reverse signals that are transmitted upstream through the reverse path to the headend equipment 105. Such reverse signals may be combined via the splitter/combiner devices 130 along with other reverse signals and then amplified by any one or more of the distribution amplifiers 125. The signals are then converted to optical signals by the optical node 115 before being provided to the headend equipment 105. It will be appreciated that in the electrical, or coaxial cable, portion of the network 100, the forward and reverse path signals are carried on the same coaxial cable 120.

A detailed example of forward and reverse optical paths that are suitable for use in a broadband communications system is shown in FIG. 2. Headend equipment 205 generates and transmits optical signals via optical transmitters 210a–n downstream through their respective fiber links 215a–n. It will be appreciated that there are a plurality of optical transmitters 210a–n transmitting optical signals to a plurality of nodes 220a–n, where each node 220 services a different portion of the system depending upon the system design. Within the nodes 220a–n, an optical receiver 230a–n converts the optical signals to electrical signals for delivery through the coaxial portion of the network. Before transmission, a diplex filter 235a–n isolates the forward electrical signals from the reverse electrical signals and provides the electrical signals to coaxial cable 240a–n for delivery to a plurality of subscriber equipment 245-n.

In the reverse path, electrical signals emanating from the plurality of subscriber equipment 245a–n are transmitted upstream via the coaxial cable 240a–n to the respective node 220a–n. The diplex filter 235a–n isolates the reverse electrical signals from the forward electrical signals and provides the reverse signals to an optical transmitter 250a–n for converting the electrical signals to optical signals for delivery through the fiber portion of the network. The optical signals are then transmitted further upstream via a reverse optical fiber 255a–n to an optical receiver 260a–n that may also be located within the headend. The optical receiver 260a–n converts the optical signals to electrical signals. Each optical receiver 260a–n then transmits the electrical signals to a passive splitter/combiner 265 for combining the electrical signals in the conventional electrical manner. Those skilled in the art will appreciate that, at this point, the electrical signals is the same as if the electrical signals from subscriber equipment was combined and carried back to the headend via analog means. Additional equipment within the headend then receives the combined electrical signal and, based on the bandwidth allocation scheme, routes portions of the signal to the correct equipment for further processing.

If additional subscribers are added to the network, it may be necessary to add an additional node 220 to service those subscribers. The new node would require separate fiber links for the forward and reverse paths to the headend and a single coaxial path to connect to the additional subscriber equipment. Additionally, if the operator chooses to optimize the network to accommodate an increase in the amount of reverse signals being transmitted by one optical transmitter due to an increase in interactive services with the subscriber equipment, an operator can accomplish this by decreasing the number of subscriber homes that a node 220, or path, services. For example, an operator can reduce an existing path that includes 2000 subscriber homes per node to 500 subscriber homes per node, and add three additional paths each including a node to service that portion of the network. It can easily be understood that increasing the size or optimizing the network requires a significant amount of equipment, fiber, and labor.

At certain times, optical signals may be combined via a passive optical combiner, similar to a passive electrical combiner, as long as the optical transmitters, optical combiner, and optical receiver are restricted to a controlled environment. Those skilled in the art will appreciate that when the optical signal from multiple optical transmitters is combined and applied simultaneously to an optical receiver, intermodulation distortion results. If the differences between these received wavelengths are sufficiently small, the intermodulation distortion produced in the optical receiver will obscure the desired electrical signals, which are, for example, signals from 5 Mega Hertz (MHz) to 42 MHz, at the output of the optical receiver. The optical transmitters, therefore, need to transmit the optical signals at different wavelengths in order for the optical receiver to distinguish between them. In a controlled environment, i.e., controlling the temperature of the optical transmitters, the required different wavelengths of the optical signals can then be strictly maintained to avoid drifting due to temperature.

In most real world applications, however, a controlled environment is difficult to achieve. For example, in a broadband communications system, such as the system shown in FIG. 1, many components are exposed to the environment, such as varying regions and temperatures. Consequently, optical transmitters may begin transmitting optical signals at a particular wavelength, but due to heat that is imposed upon the transmitter, for example, the afternoon sun, the wavelength drifts. When signals from several transmitters are combined and at least one of the wavelengths drift, the intermodulation distortion that is produced in the optical receiver will then obscure the desired signals. Moreover, it is not desirable for an operator to use different lasers (i.e., at different wavelengths) within the plurality of optical transmitters in order to transmit optical signals at substantially different wavelengths due to the cost of installing and maintaining essentially different optical transmitters. Therefore, it will be appreciated that separate reverse fiber paths, or links 255a–n, are typically required because the reverse optical signals cannot be combined like the reverse electrical signals.

Therefore, what is needed are devices and networks that are capable of transmitting and combining reverse optical signals, similar to the combining of reverse electrical signals, without having to employ optical transmitters that transmit signals at differing wavelengths. More specifically, the devices and networks need to be able to combine optical signals that may have similar wavelengths, or allow for wavelength drift, while still allowing the optical receiver to distinguish between the different optical signals. Additionally, the operator would like to use existing equipment, such as optical transmitters, that may already be placed within the network.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as limited to the embodiment set forth herein; rather, the embodiment is provided so that this disclosure will be thorough and complete, and will fully convey the scope of the invention to those skilled in the art. For example, the preferred embodiment set forth herein refers to an optical commutator, or optical combiner, that is in a broadband communications system that combines reverse optical signals from a plurality of optical transmitters. However, other embodiments of the present invention may use the optical commutator of the present invention in the forward path or to combine digital optical signals. The present invention is described more fully hereinbelow.

Figure 2:
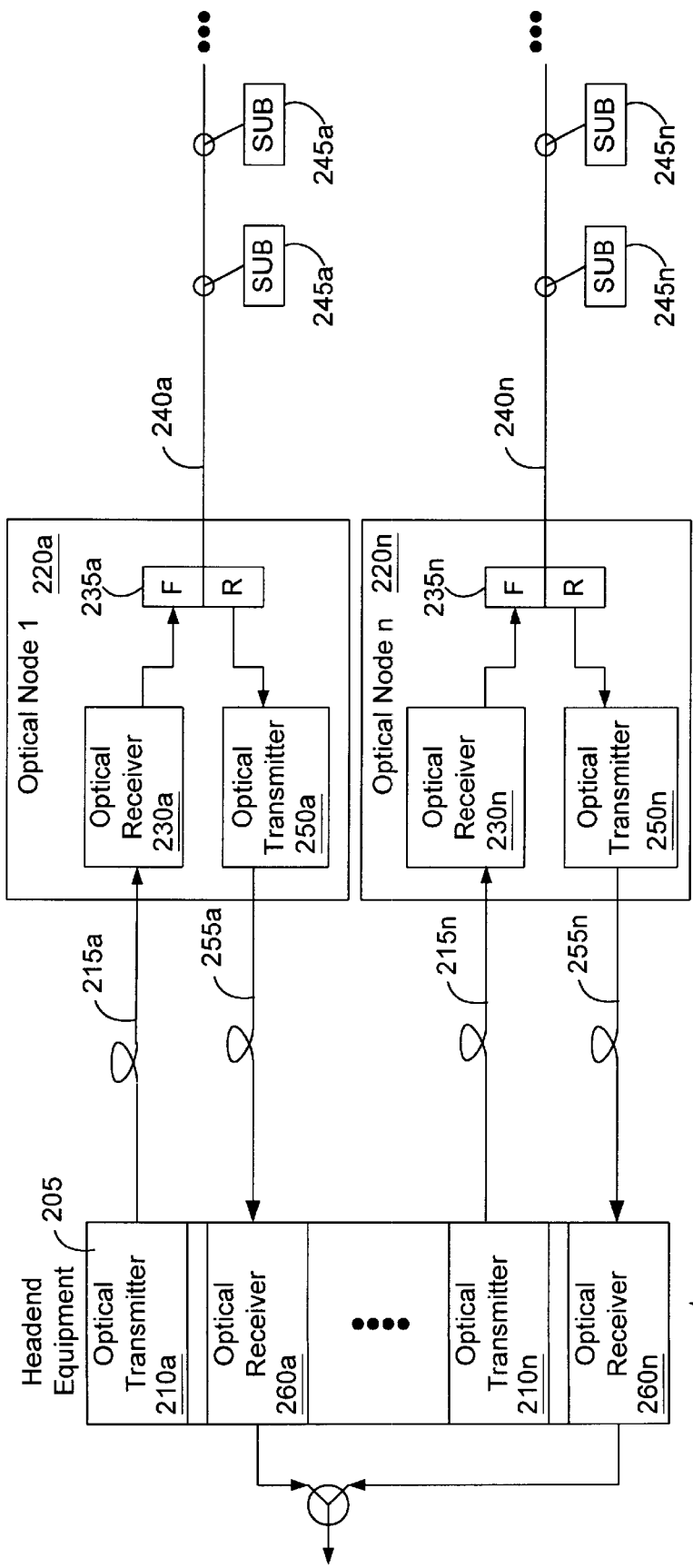
FIG. 2 is a block diagram illustrating a detailed example of forward and reverse optical paths that is suitable for use in the broadband communications system of FIG. 1.
Figure 3:
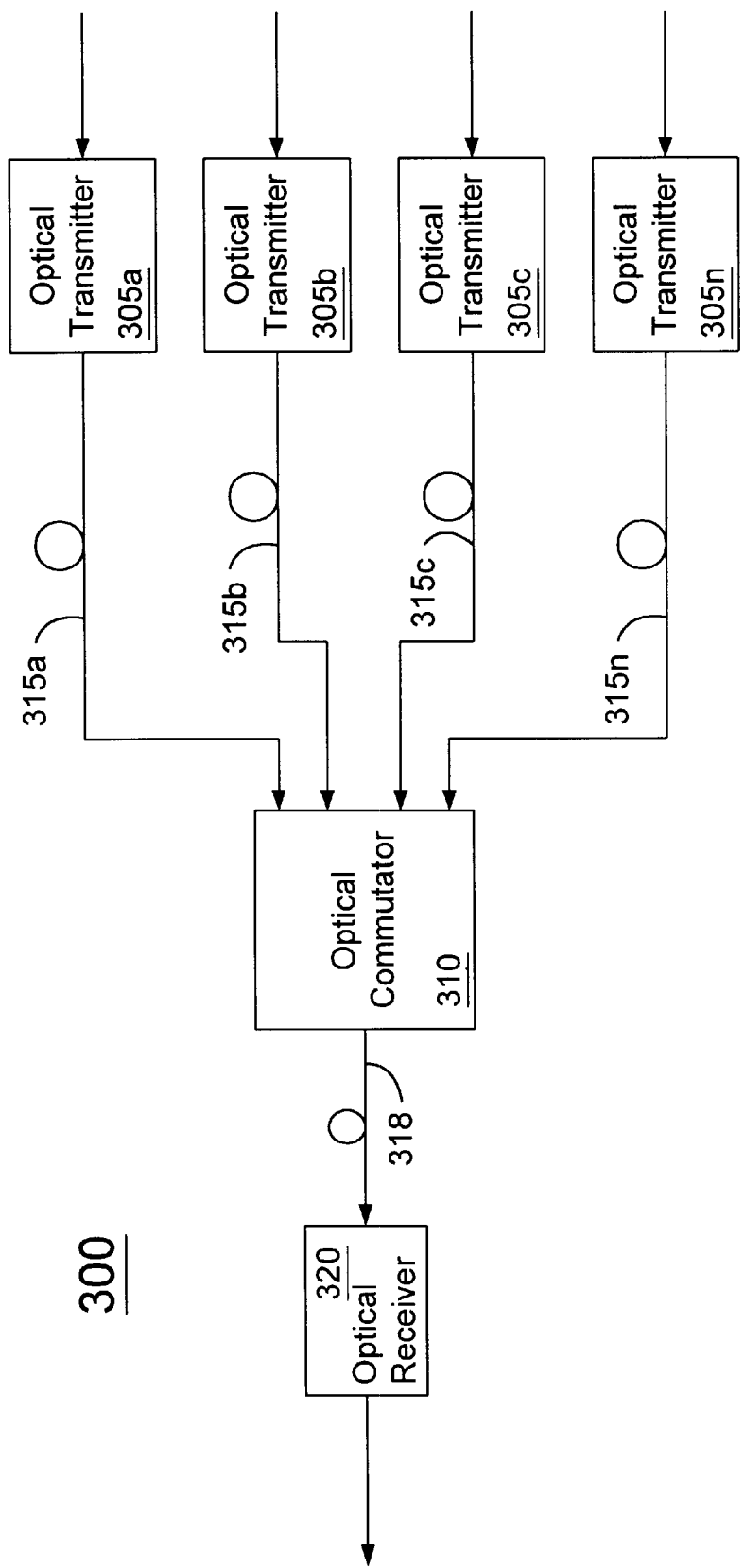
FIG. 3 is a block diagram illustrating a fiber communications path in accordance with the present invention that includes an optical commutator for combining optical signals from a plurality of optical transmitters.

Referring now to FIG. 3, illustrated therein is a fiber communications path 300 in accordance with the present invention that includes an optical commutator 310 for combining optical signals from a plurality of optical transmitters 305a–n. It will be appreciated that the optical transmitters 305a–n may be placed within a node, such as node 220a–n (FIG. 2), or configured as stand-alone units. Briefly, optical signals emanating from the plurality of transmitters 305a–n are combined through an optical commutator 310, which is coupled to the transmitters 305a–n via fibers 315 a–n. The combined optical signal is then provided, via a single optical fiber 318, to an optical receiver 320 that is located further upstream or within a headend (not shown). The optical receiver 320 converts the combined optical signal to a combined electrical signal. The combined electrical signal is then routed in the conventional electrical manner to additional headend equipment for further processing. In conventional systems, such as the system shown in FIG. 2, the passive splitter/combiner device 265 combines the electrical signals from each of the optical receivers 260a–n. In contrast, a splitter/combiner device is not required in the present invention since the optical receiver 320 (FIG. 3) provides a similar combined electrical signal at its output port.

By employing the present invention to combine the optical signals, a system operator is able to upgrade the network in a couple of ways. First, the operator may need to add an additional node to service additional subscribers; and second, the operator may need to add a reverse path if one doesn't currently exist to offer interactive services. By using the commutator 310 to combine several fibers 315a–n, either new or existing, the received optical signals may be transmitted without having to use separate fiber optic cable linking the optical transmitters to separate optical receivers. In this manner, the present invention substantially reduces the amount of previously required optical receivers and fiber that was required in conventional systems. It will be appreciated that in accordance with the present invention the number of optical transmitters that inputs signals to the commutator 310 is not limited to four as shown in FIG. 3. Moreover, the lengths of the fibers 315a–n may also vary and do not need to be of equal distance. Additionally, the optical transmitters 305a–n and the optical receiver 320 are, advantageously, conventional equipment, which is equipment used in the system shown in FIG. 2.

Figure 1:
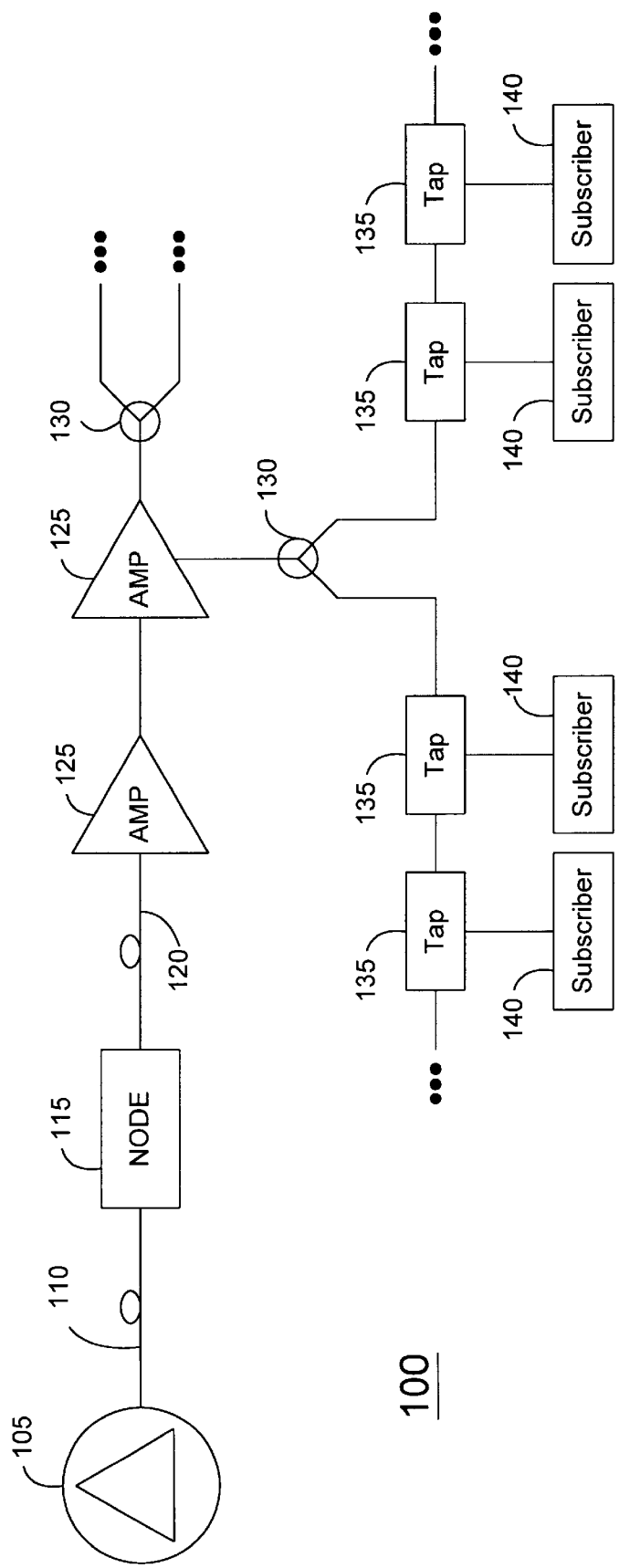
FIG. 1 is a block diagram illustrating an example of one path in a conventional broadband communications system, such as a two-way hybrid/fiber coaxial (HFC) system, that carries optical and electrical signals.

As described above in the Background of the Invention, electrical signals can be easily combined using conventional electrical techniques in the coaxial portion of the HFC network. Historically, however, optical signals cannot be combined within the fiber portion of the HFC system due to the negative effects if two or more signals arrive at the optical receiver that each possesses the same or similar wavelengths. This occurrence is fairly typical within an HFC system, such as the systems shown in FIGS. 1 and 2. Consequently, if an optical receiver within a conventional network receives at least two optical signals that each has the same or similar wavelength, the output of the optical receiver will contain only noise resulting from intermodulation distortion between the similar optical signals.

Figure 4:
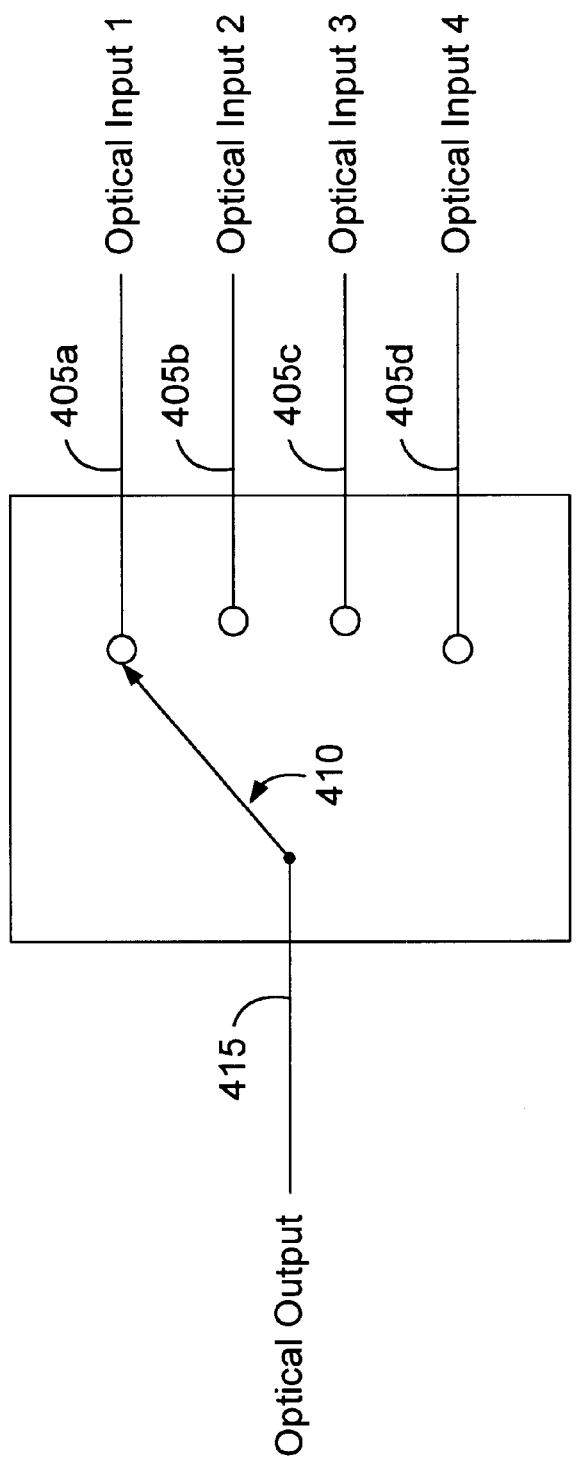
FIG. 4 is a block diagram of an optical commutator in accordance with the present invention that is suitable for combining optical signals in the fiber communications path of FIG. 3.

FIG. 4 is a block diagram of the optical commutator 310 in accordance with the present invention that is suitable for combining optical signals in the communications fiber path 300 of FIG. 3. For purposes of discussion, four optical input ports 405a–d are shown for simplicity; however, the number of optical input ports can vary, thereby changing the required specifications of the optical commutator, and is discussed in further detail below. More specifically, the commutator 310 samples each of the optical input ports 405a–d, via switch 410, at a specified switching time depending upon the frequency band of the transmitted data signals and the number of input ports. The switch is essentially the optical equivalent to an electrical rotary switch. Alternatively, the switch may be a high-speed optical switch. The combined, or sampled, output signal is then provided to output port 415.

As mentioned, the switch 410 samples each of the input ports 405 at specified time intervals depending upon the number of input ports 405 and the frequency band at which the data is routed throughout the communications path to sample the received signals adequately. Those skilled in the art will be familiar with the Nyquist theory, which states an analog signal must be sampled at a frequency that is greater than twice the maximum signal bandwidth in order to ensure that all information can be extracted and the inherent aliasing due to the sampling will not corrupt the original signal. For example, if the communications path in an HFC system, routes data throughout the system in the frequency band from 5 Mega Hertz (MHz) to 42 MHz, the maximum signal bandwidth is 37 MHz. Per Nyquist, two times 37 results in a 74 MHz. 74 MHz may then be increased to 100 MHz to ensure adequate sampling of the signal. A sampling frequency of 100 MHz corresponds to one sample every 10 nano seconds (ns). The number of input ports of the optical commutator is divided into the switching time to determine the amount of time that the switch 410 switches between each of the input ports to ensure adequate sampling of each signal. In the exemplary embodiment, if each of the four input ports must be sampled every 10 ns, then one input port must be sampled every 2.5 ns. Thus, the cycle time for sampling the four input ports 405a–d is 10 ns, which is the 100 MHz rate.

Figure 5:
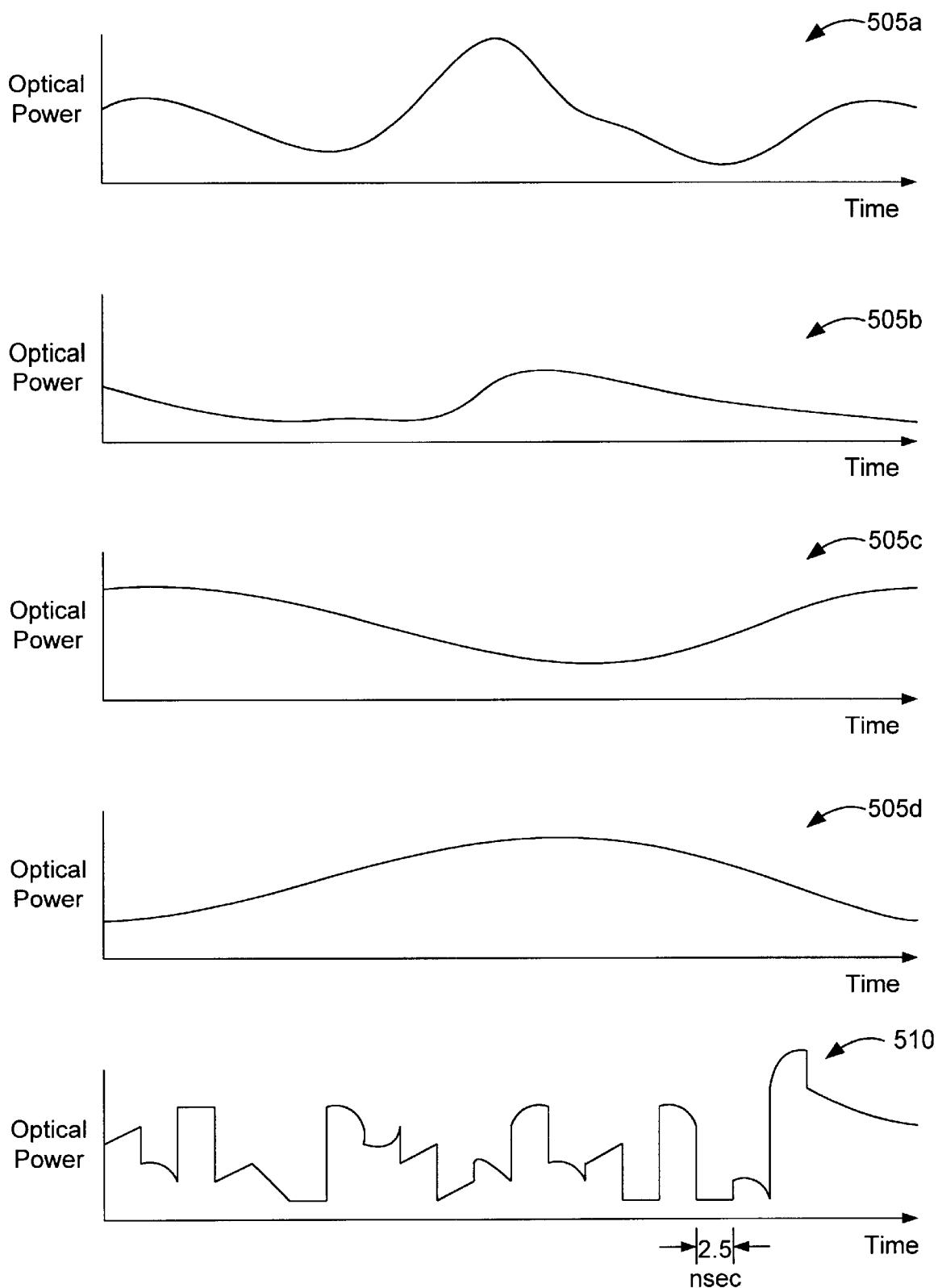
FIG. 5 is an example illustrating timing diagrams of four input optical signals from the optical transmitters and a sampling output signal of the optical commutator of FIG. 4 in accordance with the present invention.

FIG. 5 is an example illustrating timing diagrams of four input optical signals from the optical transmitters 405a–d and an output signal of the optical commutator 410 in accordance with the present invention. The first four timing diagrams 505a–d represent analog optical signals that are provided to the input ports 405a–d (FIG. 4) of the optical commutator 310 (FIG. 4). The last timing diagram 510 represents the output of the optical commutator, which combines the input signals. As can be seen from timing diagram 510, the combined output signal samples each input signal for 2.5 ns and combines, or sums, the four input signals into the combined output signal.

Referring again to FIG. 3, the optical receiver 320 receives the combined output signal and converts it to a combined electrical signal. As mentioned, this combined electrical signal is essentially the same signal as the previously combined electrical signal of FIG. 2, which uses the passive combiner 265 to combine the electrical signals from several optical receivers 260a–n. A system operator may use several optical receivers 320 (FIG. 3) within the network. In this case, the operator may need to use the passive splitter/combiner to combine the several combined electrical signals from each of the optical receivers. In this manner, the passive splitter/combiner combines all combined electrical signals and supplies the signal to additional headend equipment.

The preferred embodiment is directed to combining analog optical signals in the reverse path of a broadband communications system; however, it will be appreciated that if an optical commutator can sample sufficiently fast, digital optical signals may also combined using the optical commutator 310. For example, if digital optical signals have a data rate throughout the network of 1 Giga bits per second (Gb/s), the optical commutator would be required to sample at a rate much faster than 1 Gb/s.

In summary, an optical commutator 310 is used to combine optical signals from a plurality of optical transmitters 305a–n in the fiber communications path 300. Advantageously, this allows an operator to add the optical commutator 310 to the network in accordance with the present invention and continue using their existing optical transmitters 305a–n. In this manner, separate fiber links 315a–n will link the commutator 310 with the plurality of optical transmitters 305a–n. The commutator 310 then sends the combined optical signal to one optical receiver 320 over a single fiber cable 318. The present invention, therefore, allows a substantial decrease in the requirements for optical fiber and the number of optical receivers 320 while allowing the operator an efficient delivery system for combining optical signals.

What is claimed is:

1. An optical commutator for combining a plurality of optical signals, comprising:

a plurality of input ports, each of the input ports receiving one of the plurality of optical signals, the bandwidth of the plurality of optical signals being less than or equal to a predetermined bandwidth;

an output port for providing a combined optical signal including the plurality of optical signals;

switching means for sequentially connecting each of the plurality of input ports to the output port, where each of the plurality of input ports is connected to the output port at a frequency greater than twice the predetermined bandwidth.

2. The optical commutator of claim 1, wherein the plurality of optical signals are analog optical signals.

3. The optical commutator of claim 1, wherein the optical commutator is used within a reverse path of a broadband communications system.

4. The optical commutator of claim 3, wherein the reverse path further comprises an optical receiver for receiving the combined optical signals and for converting the combined optical signal to a combined electrical signal.

5. A communications system that includes a forward path and a reverse path for transmitting signals in a predetermined bandwidth, the reverse path comprising:

a plurality of optical transmitters, each optical transmitter transmitting optical signals over fiber optic cable;

an optical commutator coupled to each of the plurality of optical transmitters via separate fiber optic cable for combining the optical signals; the optical commutator comprising:

a plurality of input ports for receiving the optical signals from the plurality of optical transmitters;

an output port for providing a combined optical signal; and a switch for sequentially connecting each of the plurality of input ports to the output port, where each of the input ports is connected to the output port at a frequency greater than twice the predetermined bandwidth; and an optical receiver for receiving the combined optical signal and for converting the combined optical signal to a combined electrical signal.

6. The communications system of claim 5, further comprising:
- a plurality of optical receivers, each optical receiver for receiving the combined optical signal from the optical commutator and for converting the combined optical signal to the combined electrical signal; and
- a passive combiner for combining each of the combined electrical signals from the plurality of optical receivers and for transmitting an output signal; and
- headend equipment for receiving the output signal from the passive combiner and for further processing the output signal.

7. The communications system of claim 5, wherein the switch is a high-speed optical switch.

8. The communications system of claim 5, wherein the predetermined bandwidth in the reverse path ranges from 5 MHz to 40 MHz.

9. A communications system for transmitting an optical signal in a forward path and a reverse path, each path having a predetermined bandwidth, the communications system including a plurality of optical transmitters, an optical commutator, and an optical receiver, a method for combining a plurality of optical signals comprising:
- transmitting the optical signal from at least one of the plurality of optical transmitters;
- receiving the optical signal at an input port;
- sequentially connecting each input port to an output port at a frequency greater than twice the predetermined bandwidth; and
- transmitting a combined optical signal including the plurality of optical signals.

10. The method of claim 9, wherein the plurality of optical transmitters, the optical commutator, and the optical receiver are located in the reverse path.

11. The method of claim 9, wherein the communications system further includes a plurality of optical commutators, the steps further comprising:
- transmitting a combined optical signal including the plurality of optical signals from the plurality of optical commutators;
- combining each of the combined optical signals from the plurality of optical commutators; and
- providing an output signal from the combined optical signals for further processing within headend equipment.

* * * * *